Sept. 23, 1941.  K. L. LANNINGER  2,256,845
PIPE COUPLING
Filed Sept. 1, 1939  3 Sheets-Sheet 1
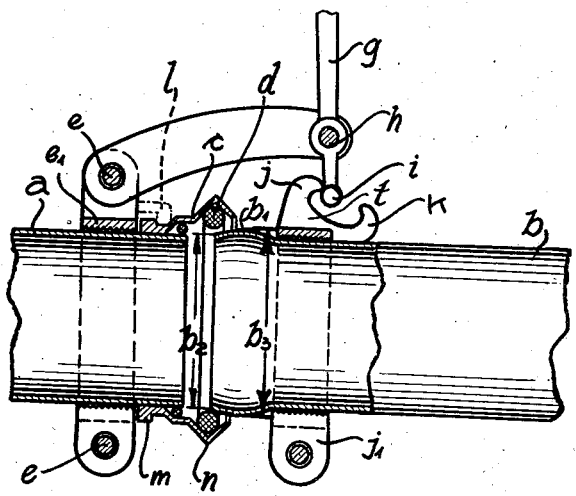
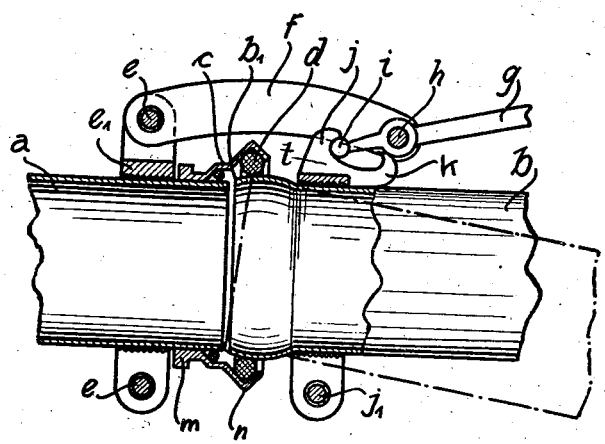
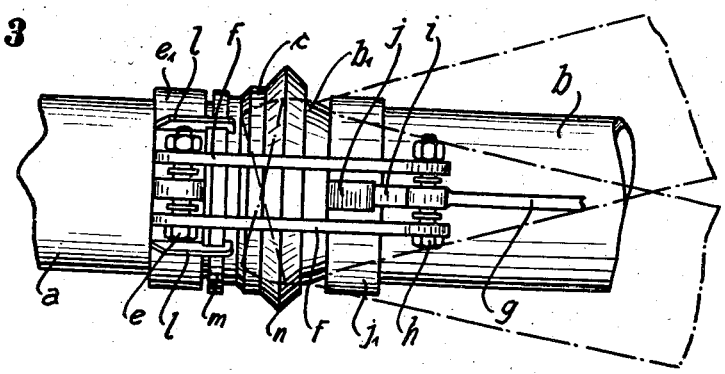
INVENTOR
K. L. LANNINGER Sept. 23, 1941.   K. L. LANNINGER   2,256,845
PIPE COUPLING
Filed Sept. 1, 1939   3 Sheets-Sheet 2

INVENTOR
K. L. LANNINGER

Sept. 23, 1941.  K. L. LANNINGER  2,256,845
PIPE COUPLING
Filed Sept. 1, 1939  3 Sheets-Sheet 3

INVENTOR
K. L. LANNINGER

Patented Sept. 23, 1941

2,256,845

UNITED STATES PATENT OFFICE 2,256,845

PIPE COUPLING

Karl Ludwig Lanninger, Frankfort-on-the-Main, Germany

Application September 1, 1939, Serial No. 293,122
In Germany September 7, 1938

2 Claims. (Cl. 285—172)

This invention relates to quick acting pipe couplings for use on pipe lines laid across open country which may require quick re-laying such as for example fire hose lines or spraying or sprinkler lines. In particular the invention relates to such couplings of the kind in which the end of one pipe is received in a socket with suitable packing ring on the end of the other pipe and the two pipes are held together by a toggle action clamping lever linked to one pipe and engaging a rocking chair member with pivoting hook terminals on the other pipe. A principal object of this invention is to make such pipe couplings capable of being rapidly joined and disconnected.

A further object is to permit adjacent pipes in such pipe couplings to be inclined relatively to one another through wide angles sufficient to adapt themselves to the contour of the ground across which the pipe line is laid.

A further object of the invention is to provide means for forcibly disconnecting the coupling when the pipe sticks in the socket as may occur on a waste water sprinkler line.

Yet another object of the invention is to provide a simple quick acting pipe coupling which can be operated with one hand.

With these and other objects in view one feature of the invention is the use of an abutment with which the toggle action clamping lever coacts having opposed operative surfaces with one of which the lever co-acts for joining the coupling and with the other of which it coacts for disconnecting the coupling. According to another feature of the invention the clamping lever makes point contact with the abutment when in the connected position.

So that the pipe end may be easily mated to the co-operating socket with its annular washer, the external diameter of the pipe is less than that of the bore of the packing ring at the end of the pipe and gradually increases to a diameter greater than that of such bore at a short distance from the end.

For ease of assembly the end of the pipe may be cut obliquely to its longitudinal axis.

The socket may be secured to the end of a pipe by means of a clamping ring to which the clamping lever is attached by the toggle link. The chair with opposed operative surfaces may be secured to the end of the other pipe by a similar clamping ring. The socket may however be integral with the pipe and the toggle link attached to a lug on the pipe.

A double ended piece with a socket on each end, a T piece or multi-way piece with sockets on each piece, may be used for joining branch lines. In such cases there will be a separate toggle action clamping lever for each pipe connected.

The invention is illustrated in the accompanying drawings in which:

Fig. 1 is a section of an embodiment according to the invention with the two pipes ready for connection.

Fig. 2 is a similar view to Fig. 1 but with the coupling in the connected position.

Fig. 3 is a plan view of the embodiment shown in Figs. 1 and 2.

Referring to Figs. 1 to 3, the coupling socket $c$ is secured on the end of one pipe $a$ by claws $l$ mounted on a clamping ring $e_1$ which engage a collar $m$ on the socket. The clamping ring $e_1$ is secured on the pipe $a$ by tightening the lower tangential bolt $e$. The socket $c$ has a part $n$ projecting beyond the end of the pipe $a$ of V shaped radial section within which a packing ring $d$ is accommodated. Upon the upper tangential bolt $e$ which passes through a lug on the clamping ring $e_1$, two toggle links $f$ are pivoted. The other ends of these links $f$ are pivoted to the clamping lever $g$ by the bolt $h$.

The pipe $b$ to be joined to pipe $a$ has a bulbous terminal gland portion $b_1$ such that the diameter at its end $b_2$ is smaller than the bore of the packing ring $d$ whereas the part of greatest diameter $b_3$ of terminal gland portion $b_1$ (Fig. 1) is larger than the bore of the ring $d$. As a result the end of the pipe $b$ may be easily mated to the socket on the pipe $a$ with its bulbous end $b_1$ within the ring $d$.

Adjacent to the bulbous end $b_1$, there is a clamping ring $j_1$ from which projects the chair member $t$ with oppositely arranged hook shaped engaging parts $j$ and $k$. When the end of the pipe $b$ has been introduced into the socket the toggle action clamping lever is moved so that its end $i$ enters the hook shaped engaging part $j$ of the chair and the lever $g$ is then moved to a position parallel to the length of the pipe (see Fig. 2). The pipe $b$ is thus forced towards the pipe $a$ by virtue of the toggle action of the lever $g$ and the end $b_1$ brought into tight contact with the ring $d$. To disconnect the coupling the lever $g$ is moved in an anti-clockwise direction (Figs. 1 and 2) until its end $i$ enters the hook shaped engaging part $k$ of the chair $t$. Further movement will by virtue of the toggle action cause the pipe $b$ to be forced out of the socket $c$.

The operative faces of the hook shaped pivoting engaging parts $j$ and $k$ of the chair $t$ and the end $i$ of the lever $g$ are formed so that only point contact is made between them. As shown, nose or terminal portion $i$ of lever $g$ is advantageously a small round ball. By virtue of this and of the bulbous end $b_1$ of the pipe $b$ the latter is able to flex freely within wide limits in all directions relatively to the pipe $a$. (See positions of pipe $b$ in dotted lines in Figs. 2 and 3.)

Figure 4:
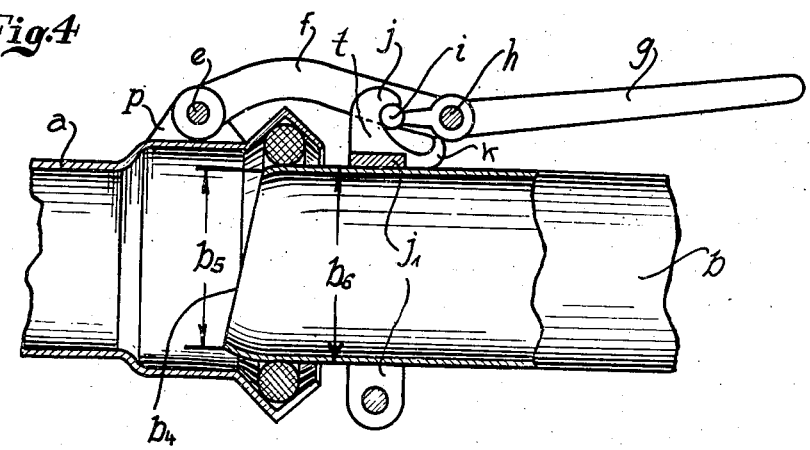
Fig. 4 is a section of an alternative form of construction of the invention with the socket and V holding part for the ring, formed integral with one pipe.

In the embodiment of the invention illustrated in Fig. 4 the socket $c_1$ is integral with the pipe $a$ which has a projecting lug $p$ to which is pivoted the toggle links $f$ and $g$ by means of the bolt $e$. In this case the end of the pipe $b$ instead of being bulbous is simply constricted so that the diameter of its end $b_5$ is smaller than the bore of the ring $d$ whereas that of the pipe itself $b_6$ is larger than the bore of the ring $d$.

Moreover the end $b_4$ of the pipe $b$ is cut obliquely to the horizontal axis. In this way the pipe may be introduced to the socket at any angle without fear of the end $b_4$ failing to center itself within the washer $d$.

Figure 5:
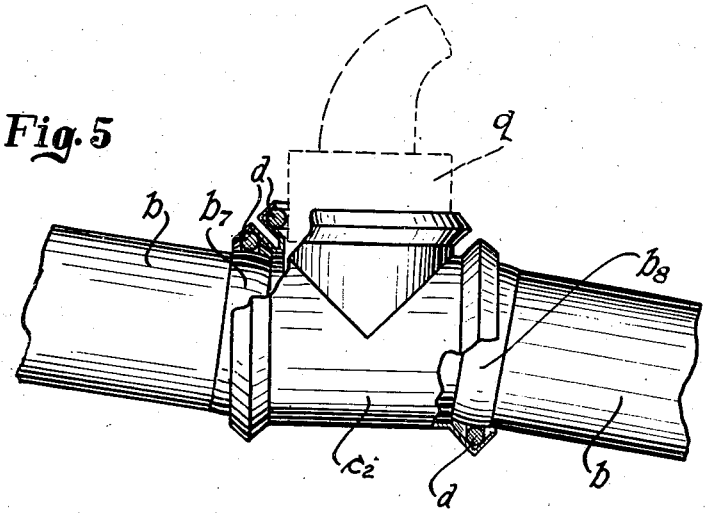
Fig. 5 shows diagrammatically as an application of the principle of my invention a T shaped socket piece for receiving two pipe ends and a branch pipe.
Figure 6:
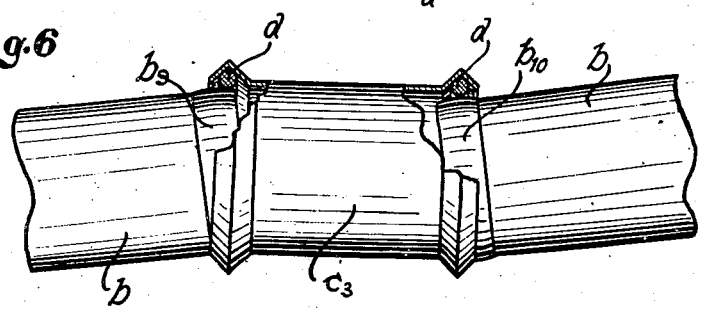
Fig. 6 shows as an application of the principle of my invention a double ended socket piece with two attached pipes.

As shown diagrammatically in Fig. 5, there is a T shaped socket piece to receive two pipe ends $b_7$, $b_8$ and a branch pipe $q$. Fig. 6 illustrates a double ended socket piece $c_3$ to receive two pipe ends $b_9$ and $b_{10}$. In these two latter figures the clamping mechanism is not shown but there will of course be a separate toggle action clamping lever for each pipe connection.

Figure 7:
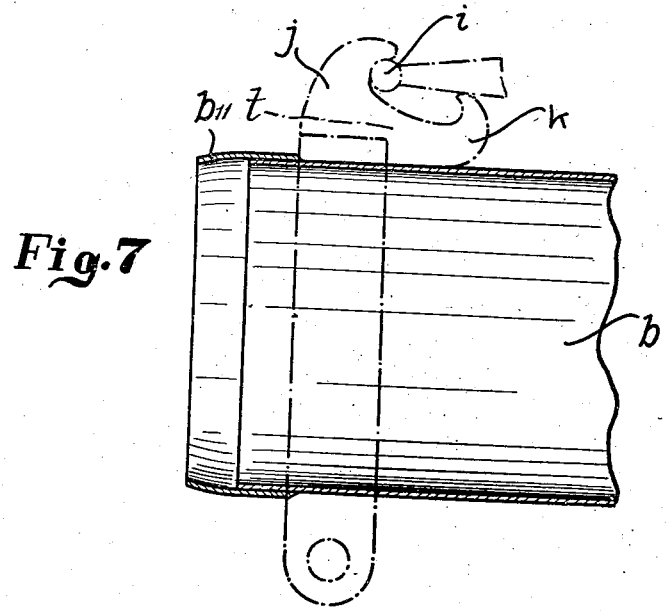
Fig. 7 is a fragmentary view of another embodiment of my invention having a constricted sleeve fitted over the end of one pipe.

In Fig. 7, the pipe $b$ has a short sleeve $b_{11}$ fitted over its end with the projecting part of the sleeve constricted so as to have dimensions $b_2$ and $b_3$ corresponding to those of the bulbous end $b_1$ of the pipe $b$ as shown in Figs. 1 and 2.

Figure 8:
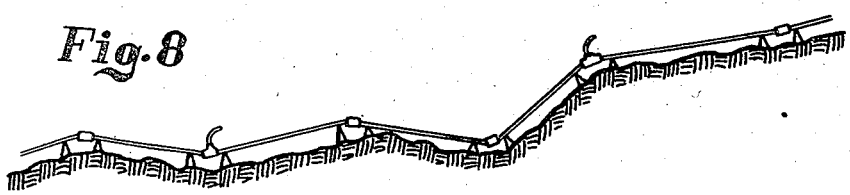
Fig. 8 illustrates a pipe line using couplings in accordance with the invention.

Fig. 8 shows a pipe line having quick acting pipe couplings in accordance with the invention laid across country and illustrates the necessity for these couplings to permit flexure of adjacent pipes relatively to one another through wide angles.

What I claim is:

1. A quickly connectible and disconnectible coupling for connecting pipe sections in angular relation, comprising, in combination, a pair of pipe sections to be connected, cooperating means carried by the juxtaposed ends of the pipe sections substantially forming a ball and socket joint, keeper means carried by one of the pipe sections and including spaced abutments facing each other and alined longitudinally of the said pipe section, said keeper means being located radially at one point only of the circumference of the pipe section by which it is carried, a link pivotally carried by the pipe section opposite that having the keeper element thereon, and a lever pivoted intermediate its ends to the free end of said link, one end of said lever being adapted to engage one of said abutments of the keeper element to pull the pipe sections together and to engage the other of said abutments to forcibly separate the pipe sections.

2. A quickly connectible and disconnectible pipe coupling for assembling pipe sections in angular relation, comprising, a pair of pipe sections, cooperating means formed on the juxtaposed ends of said pipe sections constituting a ball and socket joint, and means for positively pulling said sections together to hold them in locked relation and subsequently to force the sections apart, said means comprising a keeper element on one of the pipe sections presenting spaced abutments facing each other and alined longitudinally of the pipe section, and a lever having one end thereof adapted to engage one of said abutments to draw the pipe sections into coupling relation and to engage the other of said abutments to force the pipe sections apart, and link means pivotally connecting the intermediate portion of the lever with the pipe section opposite the section which carries the keeper element.

KARL LUDWIG LANNINGER.